Feb. 24, 1959 P. S. BLATZ 2,875,098
COATED POLYMERIC THERMOPLASTIC DIELECTRIC FILM
Filed July 18, 1955
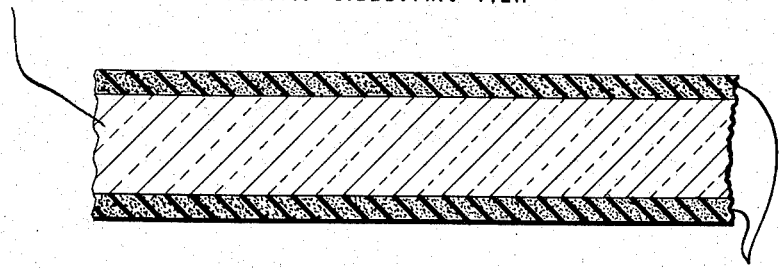
INVENTOR
PHILIP STRUBING BLATZ
BY
ATTORNEY

2,875,098

COATED POLYMERIC THERMOPLASTIC DIELECTRIC FILM

Philip Strubing Blatz, Buffalo, N. Y., assignor to E. I. du Pont de Nemours and Company, Wilmington, Del., a corporation of Delaware Application July 18, 1955, Serial No. 522,820

9 Claims. (Cl. 117—138.8)

This invention relates to a process of improving the dielectric life of polymeric thermoplastic materials useful as electrical insulation and to the product of such process, and, more particularly, to a coated polyethylene terephthalate film having an improved dielectric life.

The production of the novel class of fiber- and film-forming linear polyesters of terephthalic acid and a glycol of the series $HO(CH_2)_nOH$ where "$n$" is an integer from 2-10, inclusive, is fully disclosed in United States Patent No. 2,465,319 to Whinfield and Dickson. From a commercial standpoint, one of the most attractive polymers of this class is polyethylene terephthalate.

Polyethylene terephthalate film, particularly oriented film (film which has been stretched and/or rolled in two directions and heat-set at elevated temperatures within the range from 150°–250° C.) has been found to possess a unique combination of electrical, physical, and chemical properties which make it outstanding for use as a dielectric. This is particularly true of polyethylene terephthalate film which has been stretched and/or rolled to substantially the same degree in both directions, e. g., 3X, where X equals the original dimension of the film, to obtain a substantially "balanced" film which means that the physical properties of the film as measured in both directions are substantially the same. The oriented, heat-set polyethylene terephthalate film is outstanding as a dielectric because it retains a considerable percentage of its electrical properties, strength, and durability at elevated operating temperatures. Consequently, the film is particularly useful as a dielectric in capacitors, motors, generators, transformers, etc., at not only moderate operating temperatures, but also at ambient temperatures approaching 150°–175° C.

In extending the usefulness of polyethylene terephthalate and like thermoplastic polymeric film dielectric to a wider variety of electrical end uses, it became apparent that the dielectric life of the film required improvement, particularly for use in equipment subjected to high voltage stresses. As employed herein, the term "dielectric life" of the polymeric thermoplastic film applies to the actual time that a particular film may be subjected to a particular voltage stress under conditions of corona discharge before actual physical breakdown, i. e., rupture, of the film dielectric.

It is the action upon the polymeric film dielectric of corona discharge (in air or other gaseous medium) which causes actual physical breakdown of the film under conditions of a particular voltage stress (a potential difference large enough to produce a visible discharge but not large enough to produce instantaneous breakdown). Obviously, the lower voltage stress, the longer the dielectric life of the film. "Corona discharge" is defined as the discharge of electricity which appears upon the surface of a conductor when the potential gradient exceeds a certain value. For example, when a continuous potential applied to a pair of narrow wires is slowly increased, the voltage will be reached at which a hissing noise is heard, and a pale violet light is visible (in the dark) around the wires. This voltage is defined as the "critical visual corona point." Corona is due to ionization of the air or surrounding gases (it does not occur in a vacuum). That is, the air in the ionized region is conducting, and this results in increasing the effective diameter of the conductor. For example, even though a film dielectric is wound tightly around a wire, air is not entirely excluded from the space between the conductor and the film dielectric; and it is the air or other gaseous medium which is ionized. The corona envelopes a conductor as a concentric cylinder, and the outside diameter becomes such that the gradient at that point decreases to the rupturing point of the air. Beyond this point, the corona cannot increase for the constant applied voltage because the gradient decreases with increasing radial distance from the wire. The glow or breakdown of the surrounding air starts first at the point of maximum gradient or at the conductor surface. It is the bombardment of the dielectric film with ions or electrons that actually results initially in roughening or pitting the surface of the film. As the bombardment continues, the film eventually ruptures; hence, this causes short circuits owing to the physical failure.

An object of the present invention is to provide a polymeric thermoplastic dielectric film having increased dielectric life. A further object is to provide a polyethylene terephthalate film dielectric having increased dielectric life. A further object is to provide a process of improving the dielectric life of polymeric thermoplastic dielectric compositions, particularly polyethylene terephthalate film. A still further object is to provide a novel coating composition useful for improving the dielectric life of polymeric thermoplastic dielectric film. Other objects will be apparent from the following description of the invention.

These objects are realized in accordance with the present invention which, briefly stated, comprises providing a dielectric base film of thermoplastic polymeric material, e. g., polyethylene terephthalate, with a relatively thin adherent coating of a cured homogeneous blend comprised essentially of a polymeric silicone resin and a polymeric silicone rubber, said blend containing uniformly distributed finely divided particles from the group consisting of metal oxides from the metals of Groups IIb, III, IV, V, VI, VII and VIII of the Table of Periodic Arrangement of Elements (Mendeleeff's Table), calcium, barium, strontium and magnesium carbonates, and calcium sulfate.

The present invention will be further described specifically with respect to improving the dielectric life of polyethylene terephthalate film, but it should be understood that the invention is applicable as well to enhancing the dielectric life of other types of unplasticized polymeric thermoplastic films useful as dielectrics, such as films of polyethylene, polytetrafluoroethylene, polystyrene, polyamides, etc.

The silicone resins which may be employed in preparing the present coating compositions include a variety of well known silicone resins fully described in the prior art. For example, United States Patents Numbers 2,258,218, –220, –221 and –222 in the name of E. G. Rochow describe and claim a variety of types of silicone resins which may be employed in preparing the present coating compositions. The methyl polysiloxane resins, also known as methyl silicone resins, are described and claimed in United States Patent No. 2,258,218. These heat-hardenable methyl polysiloxane resins may be prepared, for example, by hydrolysis of suitable mixtures of methyl silicon halides, or mixtures of methyl silicon halides and a silicone tetrahalide, in such proportion that the resulting methyl polysiloxane resins contain an average of from 1 to substantially less than 2, preferably 1.3 to 1.7 methyl groups per silicon atom. The liquid hydrolysis and condensation products are resinous materials which may be further condensed or polymerized to a solid state.

Depending upon the nature of the starting materials employed in preparing, for example, a methyl silicone resin, the polymer chains are generally made up of the following types of unit structures. The dimethylsiloxy group,

comprises a considerable portion of the polymeric chains, particularly when the methyl-to-silicon ratio approaches 2. Generally, the above structural unit is assumed to include half of each of the two associated oxygen atoms and, hence, is more properly written,

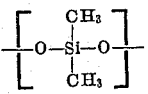

The presence of the monomethyl siloxane structural unit in the polymer chain accounts for the considerable degree of cross-linking in the structure of the silicone resins, particularly those having a methyl-to-silicon ratio considerably less than 2, e. g., 1.2, 1.3, 1.5. The monomethyl siloxane unit as written as,

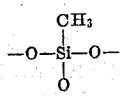

A third type of structural unit which may be found in the methyl siloxane resins is the trimethyl siloxy radical,

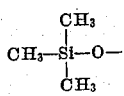

This structural unit is found as a terminal unit of a polymer chain in that the methyl groups are not capable of further condensing.

As mentioned above, other groups or radicals may replace the methyl groups in the above illustrations of typical structural units, and the resulting siloxane resins take on different characteristics. For example, United States Patent No. 2,258,220 describes and claims ethyl polysiloxane resins (ethyl silicone resins). The structure of these resins comprises structural units similar to those illustrated above except that the ethyl group replaces the methyl group.

United States Patent No. 2,258,221 describes aroxyaryl or aroxyalkyl silicone resins. Here again, the general structure of these resins contains structural groups similar to those given above except, for example, the methyl radicals are replaced with aroxyaryl or aroxyalkyl radicals.

Other available silicone resins useful for purposes of this invention are resins which contain unsaturated aliphatic radicals attached to the silicon atom, for example, methyl vinyl silicone resins.

United States Patent No. 2,258,222 describes still another type of silicone resin wherein one methyl radical in the structural units given above is replaced with an aryl group, such as a phenyl group or a halo-aryl radical. On the other hand, another useful group of silicone resins are the aryl silicone resins or aryl polysiloxane resins wherein all methyl groups in the above illustrated structural units are replaced with aryl groups, such as phenyl groups.

A considerable number of techniques and processes have been developed for preparing the silicone resins and three of the more common procedures, described with respect to preparing methyl silicone resins, are as follows:

(1) Dimethyl silicone may first be prepared by hydrolyzing dimethyldichlorosilane or its esters, and then oxidized with air and a catalyst in accordance with the process described in United States Patent No. 2,438,478 to attain the desired methyl-to-silicon ratio.

(2) Dimethyldichlorosilane may be mixed with methyltrichlorosilane or silicon tetrachloride and then hydrolyzed and the products co-condensed.

(3) Silicon tetrachloride may be partially methylated (as with methyl magnesium chloride) to the desired methyl-to-silicon ratio and the reaction mixture hydrolyzed directly as illustrated in United States Patent No. 2,258,218.

The methyl-to-silicon ratio of the final resin product is normally dependent upon the nature of the initial reactants or raw materials and the conditions of the condensation reaction. The closer the methyl-to-silicon ratio is to 2, the lower the degree of cross-linking in the resin structure; and as the methyl-to-silicon ratio approaches 1, the greater the degree of cross-linking in the resin structure. In general, it appears desirable to employ silicone resins in the present coating compositions having an R/Si ratio from about 1.3 to 1.8, where R stands for any of the types of substituent groups, or combinations thereof, mentioned above, that is, methyl, ethyl, phenyl, etc. For example, when a methyl phenyl silicone resin is used, it is normally preferred to have a higher proportion of methyl groups than phenyl groups in the resin in order to avoid brittleness, for example, a resin having an average of 1.00 methyl group and 0.80 phenyl group per silicon atom. In the present invention it is preferred to employ a substantial quantity of the flexible silicone resins. For example, the methyl phenyl silicone resins have been found to be highly desirable from the standpoint of flexibility, these resins being more flexible than the dimethyl silicone resins and the diphenyl silicone resins. In general, it is preferable to employ a mixture of silicone resins, e. g., 50% of a flexible methyl phenyl silicone resin and 50% of faster-curing, but more brittle, dimethyl silicone resin. It is preferred that at least 50% of the mixture be a flexible silicone resin.

Commercially available silicone rubbers or silicone gums which may be blended with silicone resins and the finely divided particles to form the present coating compositions are generally methyl siloxane polymers having practically no chain branching or cross-linking and an average molecular weight of 400,000 to 500,000, and in some cases as high as 1,000,000. The silicone gums in general are a water-white material having an extremely high viscosity (10,000,000 to 12,000,000 centistokes).

In the preparation of the methyl silicone gums or rubbers (described in United States Patent No. 2,448,756 to M. C. Agens), the dimethyl silicones found suitable for the preparation of materials possessing elastomeric properties are those obtained by hydrolysis of a pure or substantially pure dimethyl dihalogenosilane, such as dimethyldichlorosilane or an equivalent methyl-substituted silane, such as dimethyldiethoxysilane, containing two methyl groups and two hydrolyzable atoms or groups connected to the silicon atoms. In the case of the methyl silicone gums or rubbers, as mentioned hereinbefore, the polymer structure contains practically no branching or cross-linking, and therefore the resulting products contain a ratio of methyl-to-silicon atom of two or substantially two. For example, the dimethyl silicone gums having a methyl-to-silicon ratio from 1.98 to 2.00 may be prepared from the hydrolysis product of dimethyl dihalogenosilane alone, or a dimethyldihalogenosilane containing not more than 2 mol per cent of a methyltrihalogenosilane. The resulting products are normally divided into two groups, (1) the soluble gums having a methyl-to-silicon ratio of 2, and (2) the insoluble gums having a methyl-to-silicon ratio of at least 1.98 but less than 2. In general, the "insoluble" gums require more extensive masticating or milling with the silicone resin in the presence of a solvent in order to obtain homogeneous solutions.

Another useful type of silicone rubber which is currently commercially available is the methyl phenyl siloxane polymer (described in United States Patent No. 2,484,595 to M. M. Sprung) wherein part of the methyl groups along the siloxane chain are replaced with phenyl groups. In these rubbers the methyl plus phenyl-to-silicon ratio is also between 1.98 and 2. Other rubbery polymeric organo-siloxane compositions which may be employed in the present coating compositions include those wherein the methyl groups in the dimethyl silicone gums or rubbers are replaced by other alkyl and/or alkylene and/or aryl groups, e. g., ethyl silicone gums.

Types of finely divided particles which are to be blended with the blend of silicone resin and silicone rubber are selected from the following compounds:

(1) metal oxides from the metals of Groups IIb, III, IV, V, VI, VII and VIII of the Table of Periodic Arrangement of Elements (Mendeleeff's Table) including such metal oxides as zinc oxide, titanium dioxide, aluminum oxide ($Al_2O_3$), and iron oxide ($Fe_2O_3$), (2) Calcium, barium, strontium and magnesium carbonates, and (3) Calcium sulfate.

The essential requirement is that whenever any of the above compounds are blended with the silicone resin/silicone rubber blends the compound must be in finely divided form such that the ultimate particles, either in the form of super-colloidal aggregates or individual particles, have an average greatest dimension ranging between 5 millimicrons and 5 microns, and preferably below 50 millimicrons.

Some of the above compounds may not be commercially available in finely divided form wherein the average particle size is 5 microns or less. In such cases it is necessary to process the particles by ball milling or other techniques to reduce the size of the average particle.

In attempting to apply coating compositions to polymeric thermoplastic films useful as dielectrics for the purpose of increasing the dielectric life of a particular film, a number of influencing factors must be taken into consideration. That is, (1) the coating should not impair any of the desirable physical, chemical, or electrical properties of the base film (for example, the coating should be substantially as flexible and non-tacky as the base film), (2) the coating must be capable of being applied homogeneously over the entire film surface in order that "pinholes" in the coating are not formed, and (3) the coating should be capable of being cured at moderate temperatures in order that the base film would not have to be subjected to excessively high curing temperatures. The present silicone resin/rubber blend described herein fully meets these requirements. Furthermore, this blend, even when applied as a very thin coating (less than 1 mil thicknesses on both sides of dielectric base film) is highly effective in materially extending the dielectric life of useful dielectric films, particularly at elevated temperatures. Other types of coatings, such as silicone rubber containing finely divided particles of the type described herein (with no silicone resin) must be applied as heavy coatings to dielectric films to produce a product having a dielectric life equivalent to that attainable with the coated films of this invention. On the other hand, heavy coatings are to be avoided because they impair many of the desirable physical properties of the dielectric base film, particularly flexibility. In general, the silicone rubber lends flexibility to the coating composition; and the silicone resin composition facilitates curing the coating composition at relatively moderate temperatures which will not affect the properties of the base film, e. g., polyethylene terephthalate film.

In compounding the blend of silicone resin/silicone rubber/finely divided particles of the present invention, the following proportions of components are preferred (percent by weight of total solids): silicone resin, 40–75%; silicone rubber, 15–40%; and finely divided particles, 5–20%.

In general, the smaller the average particle size of the finely divided compound the lower the concentration (by weight) necessary to produce a satisfactory coating for dielectric base film. When the concentration of finely divided particles exceeds 20%, by weight, of total weight of the coating composition (resin/rubber/particles), the corona resistance of the resulting coated dielectric films appears to decrease; and in general, the optimum coating compositions of this invention contain no more than about 20% of the finely divided compound.

As a general observation it has been found that the degree of corona resistance of any given dielectric base film coated with the compositions of the present invention depends upon the extent of cure of the resin/rubber/particles coating, the amount (by weight) of the finely divided particles, the average particle size of the finely divided particles, and the thickness of the coating. The more complete the cure the greater the corona resistance (dielectric life) of the coated film; and the greater the coating thickness the greater the corona resistance.

The final step in providing the thermoplastic dielectric film, e. g., polyethylene terephthalate film, with a non-tacky uniform coating of the subject silicone resin/silicone rubber/finely divided particles is the curing of the resin/rubber blend at moderate or elevated temperatures. Normally, curing agents have already been incorporated into the resin and rubber compositions when these compositions are obtained from the manufacturer. The curing agents already present in the compositions may or may not be satisfactory alone; hence, it may be necessary to add an additional curing agent to the coating composition in order to accelerate the rate of cure at any selected temperature. Most of the curing agents are designed to promote relatively rapid curing at moderately elevated temperatures; and it is important in the present situation to be able to effect curing at temperatures which will not adversely affect the physical, electrical, and chemical properties of the base thermoplastic film dielectric. Numerous types of curing or vulcanizing agents may be employed and these are specifically listed and described in the prior art. Additional quantities of the curing agents may be added to the resin/rubber coating compositions in the form of solutions of the curing agents in the solvent, such as the same solvent in which the resin and rubber are to be blended, e. g., toluene, xylene, etc. Various curing agents which may be employed for the silicone resins include lead salts, such as lead naphthenate, lead octoate, zinc octoate and benzoyl peroxide. Benzoyl peroxide may also be employed as a curing agent for the silicone rubber, as described in United States Patent No. 2,448,565 to Wright and Oliver. Organic metallo compounds are also useful as curing agents for silicone rubbers and for the silicone resin/rubber blends of the present invention. These organic metallo compounds include triphenyl stilbene, dimethyl mercury, tributyl tin acetate, tetraethyl lead, tetraphenyl bismuth, lead tetraacetate, and mercury acetate, described in United States Patent No. 2,480,620 to Warrick. Other organic metallo compounds which appear to be useful in promoting curing of the present silicone resin/rubber blends include organic compounds of titanium such as the organic acyl polytitanates, such as isopropyl oleoyl polytitanate (polymeric isopropyloxy titanium oleate) which may be prepared in accordance with the process described in United States Patent No. 2,621,195 to Haslam. These organic titanium compounds serve to promote rapid curing of the silicone resin/rubber blend, particularly when employed in the presence of a small amount of an additional compound which promotes hydrolysis of the titanium compound such as red iron oxide powder.

The present coating compositions are conveniently applied to thermoplastic polymeric base films from solutions thereof in solvents in which the blending of silicone resin/silicone rubber/finely divided particles has been carried out. Thus, in compounding and preparing the present coating compositions for application to the base dielectric film, suitable quantities of the silicone resin (normally in the form of a viscous solution of the silicone resin in a solvent), the silicone rubber (normally in the form of a gel-like mixture which includes a solvent), and finely divided particles are added to a suitable quantity of a volatile organic solvent for the resin and the rubber, such as toluene, xylene, carbon tetrachloride or chloroform. As mentioned hereinbefore, other materials such as additional curing agents may then be added. The mixture of materials is agitated with the solvent medium in a suitable mixing vessel; and the insoluble components, e. g., the finely divided particles, are uniformly suspended in the solution.

The coating composition may be applied to one or both surfaces, preferably both surfaces, of the base film by any desired expedient; and the coated film may thereafter be dried at room temperature or a moderately elevated temperature to remove solvent. Curing of the blend of silicone resin/rubber may well be effected at room temperature, depending upon the curing agent, and in other cases may be carried out at elevated temperatures, e. g., 100°–175° C., for durations from 15 minutes to 60 minutes. It may be necessary, depending upon the end use for the coated dielectric films of the present invention, to apply a subcoating to the base dielectric film, e. g., oriented heat-set polyethylene terephthalate film, to improve adhesion between the base film and the silicone resin/rubber coating. When applying the subject coating compositions to polyethylene terephthalate film, it is preferred to apply a subcoating which is chemically similar to the base film. Any suitable subcoatings may be employed provided that they improve the adhesion between the base film and the present coatings and do not materially adversely affect the original combination of physical, electrical, and chemical properties of the base film. Preferred subcoatings include copolyesters derived by reacting glycol, terephthalic acid, or low alkyl ester thereof with a second acid or alkyl ester thereof from the group consisting of sebacic acid, isophthalic acid and hexahydroterephthalic acid. Normally, in preparing suitable subcoatings, it is preferred that the subcoating composition contain at least 50% of the terephthalic acid component, based upon the total weight of acid components. The subcoating compositions may be applied to the base dielectric film from solvent solutions, or homogeneous thin films of the copolyester compositions may be first applied to the dielectric base film by lamination under heat and moderate pressure.

The figure of the accompanying drawing showing a polymeric, thermoplastic, dielectric base film, provided on both surfaces with a continuous cured coating of a blend of polymeric silicone resin, a polymeric silicone rubber, and finely divided solid particles, is illustrative of the products of this invention.

The following examples of embodiments of the present invention further illustrate the principles and practice of the invention. Parts and percentages are by weight.

EXAMPLE 1

The following formulation:

| | |
|---|---|
| Methyl phenyl silicone resin (General Electric SR–17)_____parts__ | 2 |
| Dimethyl silicone resin (General Electric SR–98)_____parts__ | 2 |
| Dimethyl silicone rubber (General Electric SE–76)_____parts__ | 1 |
| Finely divided zinc oxide_____do____ | 1 |
| Lead octoate catalyst_____percent__ | [1] 3 |

[1] Based on weight of resin.

(Resin 66.7%, rubber 16.7%, zinc oxide 16.6%) was dissolved and dispersed in toluene to form a composition containing about 18% solids. This composition was placed in a container partially filled with glass beads, and the container was agitated on a rolling mill until a uniform dispersion of the non-soluble component (the zinc oxide) was obtained. Oriented (stretched 200% in both directions) heat-set (at a temperature of about 200° C.) polyethylene terephthalate film was employed as the base film dielectric. The base film (½ mil in thickness) was first coated with a thin coating (about 1 micron in thickness) applied from a solution of toluene containing 1 part of a methyl phenyl polysiloxane resin (G. E. SR–32) and 2 parts of tetraisopropyl titanate (to form a solution containing 2% solids in toluene). The base film was passed through the solution, most of the coating was wiped off, and the coated film was heated in the presence of moisture. The subcoated film was then passed through a solution of the silicone resin/silicone rubber blend and then between doctor rolls to remove excess coating composition. The coating was dried at room temperature for 1 hour. Thereafter, the coating was cured at 150° C. for 15–30 minutes. The resulting coating was smooth, non-tacky, and firmly adherent to the base polyethylene terephthalate film.

Examples 1 to 12, inclusive, are summarized in Table I.

In the case of Examples 1 to 5, inclusive, the components of the coating composition were blended together in the same proportions as in Example 1 except that the type and/or size of the finely divided particles was varied. The coating procedure and conditions were also the same as in Example 1.

In Examples 6 to 12, inclusive, the components of the coating composition were blended together in the following proportions:

| | |
|---|---|
| Methyl phenyl silicone resin (G. E. SR–32)__parts__ | 4 |
| Dimethyl silicone rubber (G. E. SE–76)_____do____ | 1 |
| Finely divided particles_____do____ | 1 |
| Lead octoate catalyst_____percent__ | [1] 3 |

[1] Based on weight of resin.

The coating procedure and conditions for Examples 6 to 12, inclusive, were the same as in Example 1.

TABLE I.—*Dielectric life (corona resistance) of polyethylene terephthalate film (½ mil thickness) coated with silicone resin/silicone rubber/finely divided particles composition*

| Example | Type of Particle | Average Particle Size (microns) | Total Film Thickness (mils) | Dielectric Life at 1,000 Volts/Mil (hours) |
|---|---|---|---|---|
| Control | None | | 0.5 | 5–7 |
| 1 | Zinc oxide (ZnO) | 0.10 | 1.1 | 172 |
| 2 | Zinc oxide (ZnO) | 1.5 | 1.2 | 21 |
| 3 | Calcium carbonate (CaCO₃) | 0.03 | 1.0 | >232 |
| 4 | Calcium carbonate (CaCO₃) | 1.0 | 1.0 | 99 |
| 5 | Calcium carbonate (CaCO₃) | 1.0 | 1.1 | 136 |
| 6 | Titanium dioxide (TiO₂) | 1.0 | 1.2 | 48 |
| 7 | Aluminum oxide (Al₂O₃) | 0.03 | 1.0 | 39 |
| 8 | Iron oxide (Fe₂O₃) | 0.35 | 1.0 | 49 |
| 9 | Calcium sulfate (CaSO₄) | 0.8 | 1.0 | 54 |
| 10 | Vanadium pentoxide (V₂O₅) | <0.5 | 1.0 | >50 |
| 11 | Chromium trioxide (CrO₃) | <0.5 | 1.0 | >50 |
| 12 | Manganese dioxide (MnO₂) | <0.5 | 1.0 | >50 |

DIELECTRIC LIFE TEST

The film sample to be tested was placed on a brass plate to which the high voltage was to be applied. A brass rod (6" long and ¼" in diameter) was placed on top of the film sample and normal to the brass plate (the film sample was sandwiched between the brass plate and an end of the brass rod). The rod served as the ground electrode. The end of the rod touching the film sample was rounded off at a radius of curvature of ⅟₁₆". The pressure exerted on the film was due only to the gravitational forces on the rod. The entire test apparatus was set up in air. Sufficient voltage was applied to the plate to give a voltage stress of 1000 volts per mil across the sample. Failure of the sample was indicated by a rapid increase in the flow of current between the brass plate and brass rod. At the moment current flowed, an arc was struck between the electrodes, the arc passing through the hole in the film caused by the failure. The abrupt increase in the flow of current was used to trip a relay giving a record of the failure. Ten samples were treated simultaneously. The time to the failure of the fifth sample was used as a measure of the dielectric life (under corona discharge conditions) of the material tested.

EXAMPLE 13

The following example illustrates the preparation of a high-density polyethylene having an adherent coating of a silicone resin/silicone rubber/calcium carbonate composition.

A high-density (having a density of 0.955) polyethylene composition was melt extruded to form a film of 1 mil in thickness. This film was coated (in a manner similar to that described in Example 3) with the same coating composition of Example 3 except that the curing catalyst employed was composed of 2½% of lead octoate and ½% of triethanolamine, based upon the total weight of silicone resin. The resulting coating was dried and cured at room temperature, and the total coated film thickness was 2 mils.

The dielectric life of the coated film was greater than 50 hours at 1000 volts per mil at room temperature (time to the 5th failure out of 10). The dielectric life of the uncoated film under the same conditions was 13 hours.

This application is a continuation-in-part of my copending application Serial No. 439,157, filed June 24, 1954.

I claim:

1. A product of manufacture comprising a polymeric, thermoplastic, dielectric base film having an adherent continuous coating of a cured homogeneous blend comprised essentially of an organic polysiloxane resin having a ratio of organic group-to-silicon of 1.3–1.8:1, an organic polysiloxane rubber having an average molecular weight of at least 400,000 and a ratio of organic groups-to-silicon of 1.98–2.0:1, and finely divided particles from the group consisting of metal oxides from the metals of Groups IIb, III, IV, V, VI, VII and VIII of the Table of Periodic Arrangement of Elements, calcium, barium, strontium and magnesium carbonates, and calcium sulfate.

2. A product according to claim 1 wherein the finely divided particles have an ultimate average particle size between 5 millimicrons and 5 microns.

3. A product according to claim 1 wherein the base film is polyethylene terephthalate film.

4. A product according to claim 1 wherein the base film is balanced, heat-set polyethylene terephthalate film.

5. A product according to claim 4 wherein the finely divided particles have an ultimate average particle size between 5 millimicrons and 5 microns.

6. Balanced, heat-set polyethylene terephthalate film having a continuous adherent coating of a cure homogeneous blend comprised essentially of from 40–75% by weight of an organic polysiloxane rubber having an average molecular weight of at least 400,000 and a ratio of organic group-to-silicon of 1.98–2.0:1, based on the total weight of solids in the coating, from 15–40% by weight of an organic polysiloxane rubber having an average molecular weight of at least 400,000 and a ratio of organic groups-to-silicon of 1.98–2.0:1, and from 5–20% by weight of finely divided particles from the group consisting of metal oxides from the metals of Groups IIb, III, IV, V, VI, VII and VIII of the Table of Periodic Arrangement of Elements, calcium, barium, strontium and magnesium carbonates, and calcium sulfate, said particles having an ultimate average particle size between 5 millimicrons and 5 microns.

7. The process which comprises coating a polymeric thermoplastic dielectric base film with a coating composition comprising essentially a solution of a homogeneous blend of an organic polysiloxane resin having a ratio of organic groups-to-silicon of 1.3–1.8:1 and an organic polysiloxane rubber having an average molecular weight of at least 400,000 and a ratio of organic groups-to-silicon of 1.98–2.0:1 in a volatile organic solvent for said resin and said rubber, said solution having dispersed therein finely divided particles from the group consisting of metal oxides from the metals of Groups IIb, III, IV, V, VI, VII and VIII of the Table of Periodic Arrangement of Elements, calcium, barium, strontium and magnesium carbonates, and calcium sulfate, drying the coated film to remove volatile organic solvent, and curing the resulting coating.

8. The process of claim 7 wherein the base film is polyethylene terephthalate film.

9. The process of claim 7 wherein the base film is balanced, heat-set polyethylene terephthalate film.

References Cited in the file of this patent

UNITED STATES PATENTS

| | | |
|---|---|---|
| 2,442,196 | Coggeshall | May 25, 1948 |
| 2,494,920 | Warrick | Jan. 17, 1950 |
| 2,541,137 | Warrick | Feb. 13, 1951 |
| 2,601,337 | Smith-Johannsen | June 24, 1952 |
| 2,735,791 | Peyrot et al. | Feb. 21, 1956 |

OTHER REFERENCES

"An Introduction to the Chemistry of the Silicons" (Rochow), published by John Wiley and Sons, Inc. (N. Y.), 1947 (p. 73 relied on).

UNITED STATES PATENT OFFICE
CERTIFICATE OF CORRECTION

Patent No. 2,875,098 February 24, 1959

Philip Strubing Blatz

It is hereby certified that error appears in the printed specification of the above numbered patent requiring correction and that the said Letters Patent should read as corrected below.

Column 10, line 12, for "cure" read -- cured --; lines 14, 15 and 16, for "rubber having an average molecular weight of at least 400,000 and a ratio of organic group-to-silicon of 1.98-2.0:1," read -- resin having a ratio of organic groups-to-silicon of 1.3-1.8:1, --.

Signed and sealed this 30th day of June 1959.

(SEAL)
Attest:

KARL H. AXLINE
Attesting Officer

ROBERT C. WATSON
Commissioner of Patents